United States Patent
Mansour et al.

(10) Patent No.: US 8,194,611 B2
(45) Date of Patent: Jun. 5, 2012

(54) SYSTEM AND METHOD OF AUTOMATICALLY OPTIMIZING AN OPERATIONAL RADIO ACCESS NETWORK

(75) Inventors: Nagi A. Mansour, Arlington, VA (US); Habib Riazi, Stafford, VA (US)

(73) Assignee: Clearwire IP Holdings LLC, Bellevue, WA (US)

(*) Notice: Subject to any disclaimer, the term of this patent is extended or adjusted under 35 U.S.C. 154(b) by 560 days.

(21) Appl. No.: 12/407,059

(22) Filed: Mar. 19, 2009

(65) Prior Publication Data

US 2010/0238899 A1 Sep. 23, 2010

(51) Int. Cl.
*H04W 4/00* (2009.01)
(52) U.S. Cl. ........................... 370/331; 370/252
(58) Field of Classification Search ............... None
See application file for complete search history.

(56) References Cited

U.S. PATENT DOCUMENTS

| | | | |
|---|---|---|---|
| 6,157,838 A * | 12/2000 | Di Huo et al. | 455/439 |
| 6,333,979 B1 * | 12/2001 | Bondi et al. | 379/219 |
| 2008/0232330 A1 * | 9/2008 | Lee et al. | 370/335 |
| 2010/0118725 A1 * | 5/2010 | Chiou et al. | 370/252 |
| 2010/0216467 A1 * | 8/2010 | Ryan et al. | 455/435.1 |

* cited by examiner

*Primary Examiner* — Chi Pham
*Assistant Examiner* — Kouroush Mohebbi
(74) *Attorney, Agent, or Firm* — Crowell & Moring LLP

(57) ABSTRACT

Systems and methods of automatically optimizing an operational radio access network are provided. Objective and operational cost functions for the radio access network are generated, and a deviation between the generated cost functions is determined. At least one aspect of the radio access network is adjusted in order to minimize the determined deviation between cost functions.

15 Claims, 3 Drawing Sheets

SYSTEM AND METHOD OF AUTOMATICALLY OPTIMIZING AN OPERATIONAL RADIO ACCESS NETWORK

BACKGROUND OF THE INVENTION

Wireless communication networks are very complicated, and expensive to deploy. Prior to deploying a wireless communication network, extensive computer simulations are performed in order to optimize the parameters and placement of networks elements. Computer simulations cannot, however, account for the real-world conditions in which the network is deployed. Accordingly, once a wireless communication network is installed, additional testing is performed in order to account for real-world conditions. Furthermore, as wireless communication networks are expanded with additional base stations to provide additional capacity or coverage, the network must again be tested to optimize the base stations.

SUMMARY OF THE INVENTION

Exemplary embodiments of the present invention are directed to systems and methods of automatically optimizing an operational radio access network using the system's key performance parameters and desired service outcome. An exemplary method involves receiving information related to operational coverage, capacity and handoffs in a radio access network and generating an operational cost function based on the received information related to operational coverage, capacity and handoffs. Information related to objective coverage, capacity and handoffs in a radio access network is received and an objective cost function based on the received information related to objective coverage, capacity and handoffs is generated. A deviation between the operational and objective cost functions is determined and an aspect of at least one of the operational coverage, capacity and handoffs is automatically adjusted to minimize the determined deviation.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
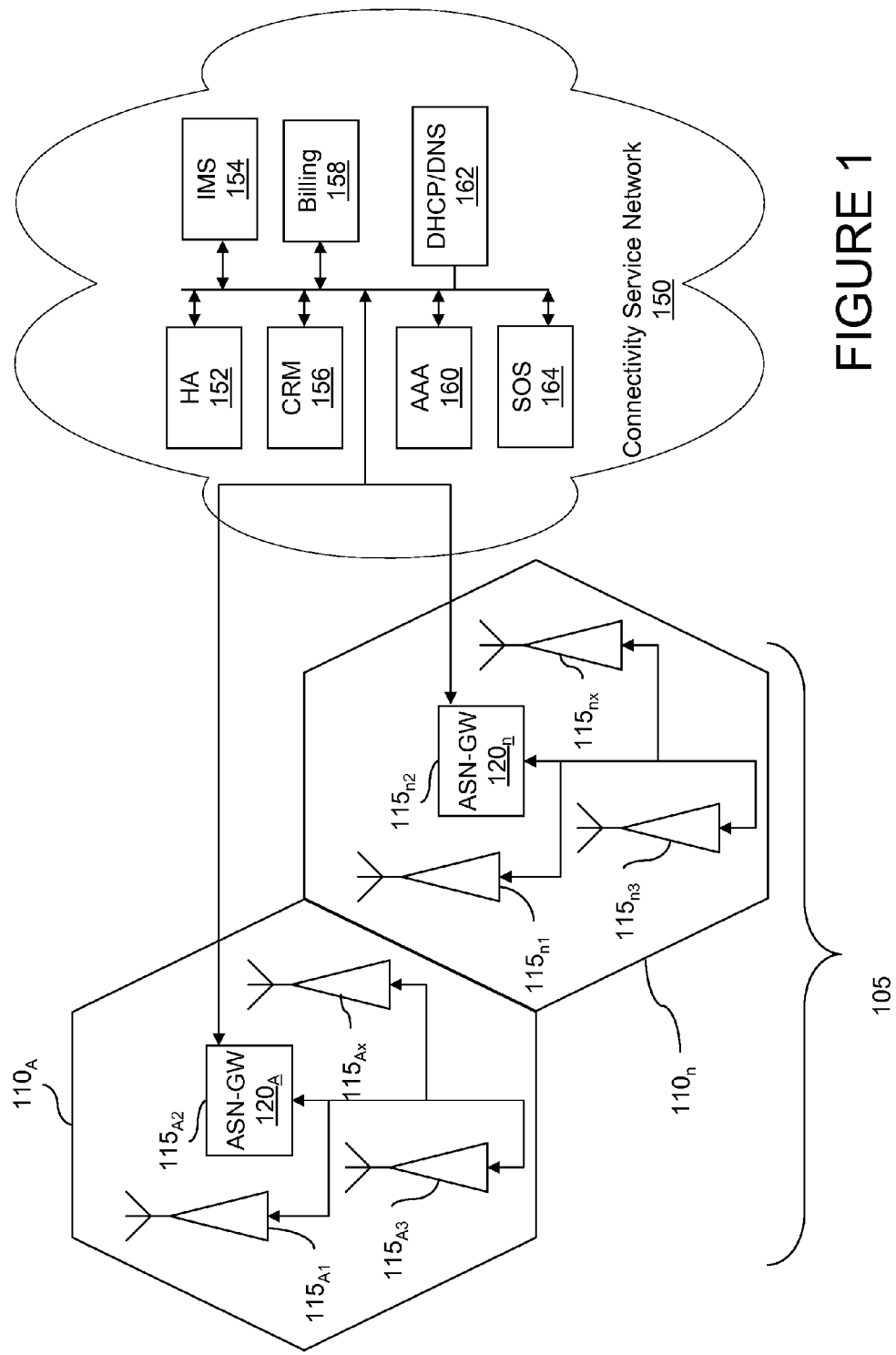
FIG. 1 is a block diagram of an exemplary network in accordance with the present invention.

FIG. 1 is a block diagram of an exemplary network in accordance with the present invention. The illustrated network is a WiMAX network that includes a radio access network 105 and a connectivity service network 150. The radio access network includes a plurality of cells $110_A$-$110_n$. Each cell includes a plurality of base stations $115_{A1}$-$115_{nx}$ coupled to an application service node-gateway (ASN-GW) $120_A$-$120_n$. Each ASN-GW $120_A$-$120_n$ is coupled to the connectivity service network 150.

Connectivity service network 150 includes a home agent 152, Internet Protocol multimedia system (IMS) 154, customer relationship manager (CRM) 156, billing component 158, authentication, authorization and accounting component 160 and dynamic host control protocol/domain name server (DHCP/DNS) 162. Additionally, connectivity service network 150 includes service optimizer system (SOS) 164, which as will be described in more detail below, receives information from ASN-GWs $120_A$-$120_n$ and provides information back that is used to control the radio access network. Although exemplary embodiments are described in connection with the WiMAX network, the present invention is equally applicable to other types of networks, such as CDMA, GSM, iDEN, EV-DO, EDGE, etc. Furthermore, although FIG. 1 illustrates a particular number of base stations within each cell and a particular number of cells, the present invention can be employed with a different number of base stations per cell and a different number of cells.

Figure 2:
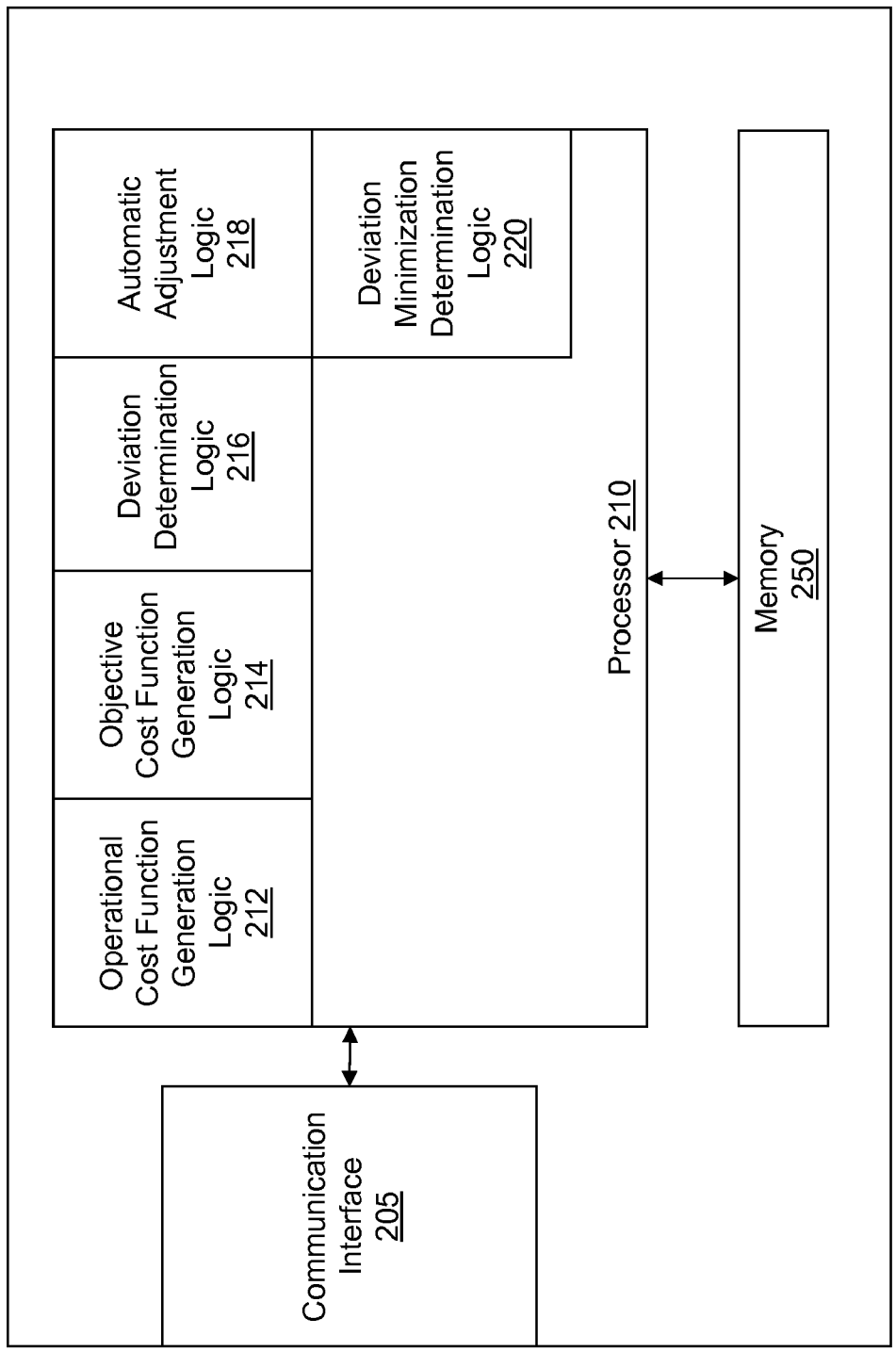
FIG. 2 is a block diagram of an exemplary service optimizer system in accordance with the present invention.

FIG. 2 is a block diagram of an exemplary service optimizer system 164 in accordance with the present invention. Service optimizer system 164 includes a communication interface 205 for communicating with ASN-GWs $120_A$-$120_n$, as well as other components of the connectivity service network 150. Communication interface is coupled to processor 210, which in turn is coupled to memory 250. Processor 210 includes logic 212-220, which will be described in more detail below in connection with the method of FIG. 3. Processor 210 can be a microprocessor, field programmable gate array (FPGA) and/or application specific integrated circuit (ASIC). When processor 210 is a microprocessor, logic 212-220 can be processor-executable code loaded from memory 250.

Figure 3:
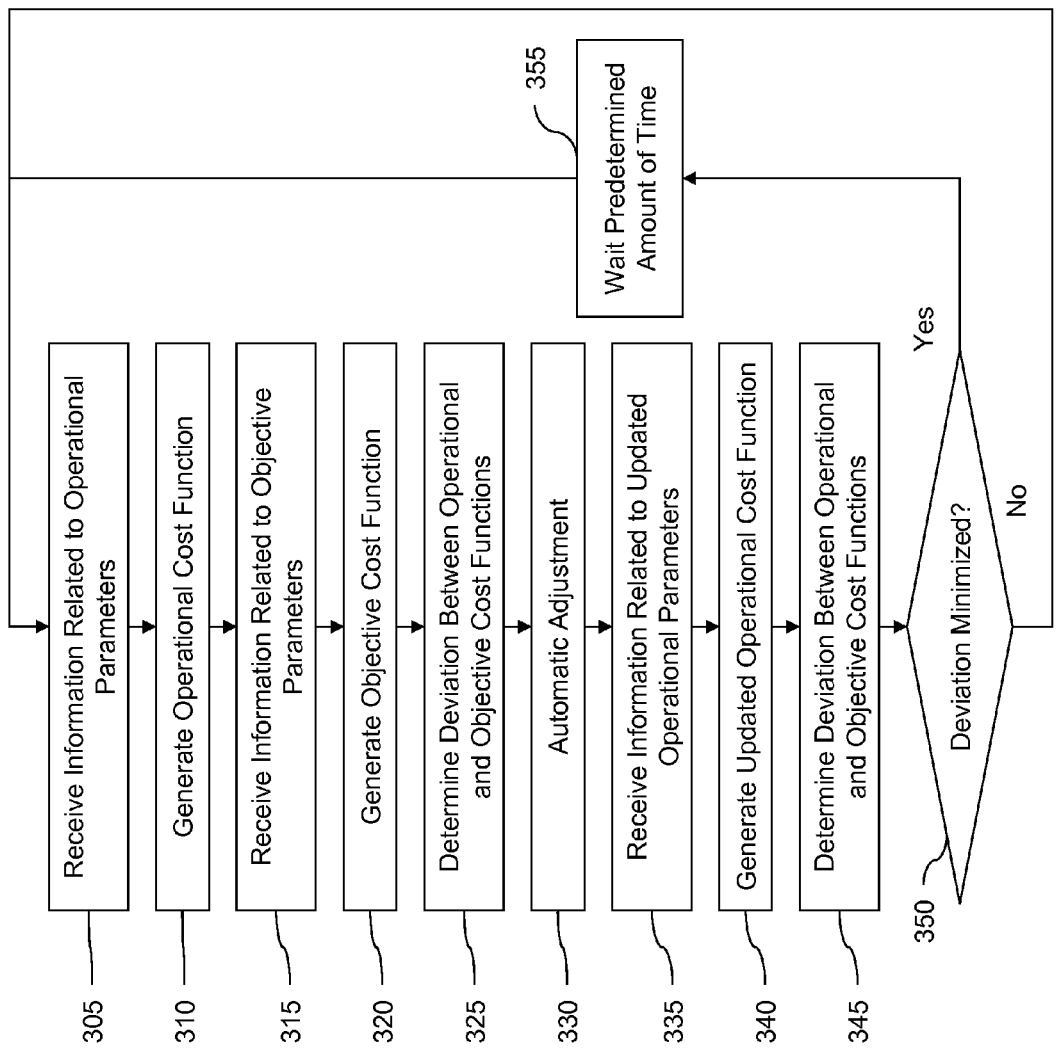
FIG. 3 is a flow diagram of an exemplary method in accordance with the present invention.

FIG. 3 is a flow diagram of an exemplary method in accordance with the present invention. Initially, service optimizer system 164 receives information related to operational parameters from one or more ASN-GWs $120_A$-$120_n$ via communication interface 205 (step 305). Logic 212 generates an operational cost function using the received information (step 310). An exemplary cost function ($CF_{Op}$) is $$CF_{Op} = A * X_{Cov} + B * Y_{Cap} + C * Z_{HO}$$

where $X_{Cov}$ is the coverage function, $Y_{Cap}$ is the capacity function, $Z_{HO}$ is a handoff function, and A, B and C are weights that can be adjusted depending upon whether the optimization is being performed during the busy hour or normal operating hours. Thus, the cost function during normal hours is expressed as $CF_{nh}$ and the cost function during busy hours is expressed as $CF_{bh}$.

The Coverage function $X_{Cov}$ depends on several parameters as follow:

$X_{Cov} = F_{bh}$[BTS EIRP, MAP repetition, CINR, Paging Cycle, ARQ Block Size, CPE EIRP, RSSI, user throughput, average sector throughput]

The coverage function includes some parameters that can be adjusted by the network administrator and other parameters that are dependent upon the network environment. The administrator adjustable parameters include BTS EIRP (which is a function of the transmit power minus the cable loss plus the antenna gain), MAP repetition (a constant that can be dynamic), Paging Cycle (a constant that can be dynamic), ARQ Block Size (a constant that can be dynamic), and CPE EIRP (which is a function of the transmit power plus the antenna gain). The environmental dependent parameters include CINR, RSSI, user throughput and average sector throughput. Although particular parameters are described above, the cost function can include a greater or less number of parameters or different parameters.

The capacity function $Y_{Cap}$ depends on several parameters as follow:

$Y_{Cap}=F_{bh}$[Sleep Timer, Idle Timer, Throughput CAP, ARQ Block Size, CINR, RSSI]

The administrator adjustable parameters include the sleep timer, idle timer, MAP repetition (a constant that can be dynamic) and ARQ block size (a constant that can be dynamic). The environmental-dependent parameters include CINR, RSSI and throughput capacity. Although particular parameters are described above, the cost function can include a greater or less number of parameters or different parameters.

The HO function $Z_{HO}$ depends on several parameters as follow:

$Z_{HO}=F_{bh}$[HO Delay Timer, Add Threshold, Delete Threshold, Trigger CINR, RSSI, Neighbor List]

The administrator adjustable parameters include handover delay timer, neighbor add threshold, neighbor delete threshold, trigger CINR and neighbor list. The environmental dependent parameters include CINR and RSSI. Although particular parameters are described above, the cost function can include a greater or less number of parameters or different parameters.

Referring again to FIGS. 2 and 3, processor 210 then receives information related to objective parameters (step 315) and logic 214 generates an objective cost function using the received information (step 320). The objective cost function is as follows:

$$CF_{Obj}=A*X_{Cov}+B*Y_{Cap}+C*Z_{HO}$$

The coverage, capacity and handoff functions for the objective cost functions use the same parameters as those described above in connection with the operational cost function, but the data for the parameters is based on objective values. The objective values can be derived by a simulation of the network and/or one or more of the values can be set by a network administrator.

The objective parameters can be received from memory 250. Logic 216 then determines a deviation between the operational and objective cost functions (step 325) and logic 218 automatically adjusts at least one parameter of the cost functions in order to minimize the deviation (step 330).

The minimization of the deviations of the cost functions can be expressed as $[CF_{Op}-CF_{Obj}]^2$, where the minimized cost function for the busy hour is:

$$CF=\Sigma_i A_{bh} X_i + \Sigma_i B_{bh} Y_i + \Sigma_i C_{bh} Z_i$$

Accordingly, the minimization of the cost function becomes $$[CF_{Op}-CF_{Obj}]^2 = \sum_i A_{bh}(X_i-\overline{X})^2 + \sum_i B_{bh}(Y_i-\overline{Y})^2 + \sum_i C_{bh}(Z_i-\overline{Z})^2$$

Processor 210 then receives updated information related to the operational parameters that account for the automatic adjustment (step 335) and logic 212 generates an updated operational cost function (step 340). Logic 216 then determines a deviation between the updated operational cost function and the objective cost function (step 345). Logic 220 then determines whether the deviation is minimized (step 350). When the deviation is not minimized ("No" path out of decision step 350), then the process is immediately repeated. When the deviation is minimized, then the process is repeated after a predetermined delay or an event trigger from the service network (step 355). Accordingly, the present invention provides an iterative technique for automatically adjusting parameters of, and in turn performance in, a live radio access network in order to converge the parameters to optimum values. The method of FIG. 3 can be performed on an entire network basis, and/or on a per sector, cell or location area basis.

Although the present invention has been described above in connection with particular parameters used in the cost functions, the present invention can use other parameters in addition to, or as an alternative to, those discussed above. These additional parameters can be, for example:

operational and performance information, including number of radio channels, size of radio channels, transmitted power, coding, modulation;

system statistics, including call admissions, dropped calls/sessions, network entry attempts;

operator parameters, including backhaul capacity, available spectrum, service policy;

geographical information, including ground cover, land use, location of base stations, minimum acceptable service quality; and historical performance information, including utilization of each of the network resources, faults and alarms indicating service quality issues, number of active and dormant users during each time interval, location of served mobile stations relative to the base station, amount of traffic demand, traffic successfully delivered to the mobile stations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method, comprising the acts of:

receiving information related to operational coverage, capacity and handoffs in a radio access network;

generating an operational cost function based on the received information related to operational coverage, capacity and handoffs;

receiving information related to objective coverage, capacity and handoffs in a radio access network;

generating an objective cost function based on the received information related to objective coverage, capacity and handoffs;

determining a deviation between the operational and objective cost functions; and automatically adjusting an aspect of at least one of the operational coverage, capacity and handoffs to minimize the determined deviation, wherein the operational and objective cost functions are adjusted using a weighting factor that accounts for network parameters during different hours of the day.

2. The method of claim 1, wherein after the aspect of at least one of the operational coverage, capacity and handoffs is adjusted, the method comprising:

receiving information related to adjusted operational coverage, capacity and handoffs in a radio access network;

generating an adjusted operational cost function based on the received information related to operational coverage, capacity and handoffs;

determining a deviation between the adjusted operational cost function and the objective cost function; and automatically adjusting an aspect of at least one of the adjusted operational coverage, capacity and handoffs to minimize the determined deviation.

3. The method of claim 1, wherein each of the information related to the operational coverage, capacity and handoffs is a cost function.

4. The method of claim 3, wherein the cost function of each of the operational coverage, capacity and handoffs includes network operator adjustable parameters and environmental-dependent parameters.

5. The method of claim 4, wherein the automatic adjustment involves network operator adjustable parameters.

6. The method of claim 1, wherein the radio access network operates using orthogonal frequency division multiple access (OFDMA).

7. The method of claim 6, wherein the radio access network is a WiMAX network.

8. The method of claim 1, wherein the radio access network is a code division multiple access (CDMA), Global System for Mobile Communication (GSM), integrated digital enhanced network (iDEN), evolution-data only (EV-DO) CDMA network or Enhanced Data GSM Environment (EDGE) network.

9. A component of a wireless network, the component comprising:

a memory;

a communication interface that receives information related to operational coverage, capacity and handoffs in a radio access network and information related to objective coverage, capacity and handoffs in a radio access network; and a processor coupled to the memory and communication interface, the processor comprising logic that generates an operational cost function based on the received information related to operational coverage, capacity and handoffs;

logic that generates an objective cost function based on the received information related to objective coverage, capacity and handoffs;

logic that determines a deviation between the operational and objective cost functions; and logic that automatically adjusts an aspect of at least one of the operational coverage, capacity and handoffs to minimize the determined deviation, wherein the operational and objective cost functions are adjusted using a weighting factor that accounts for network parameters during different hours of the day.

10. The component of claim 9, wherein each of the information related to the operational coverage, capacity and handoffs is a cost function.

11. The component of claim 10, wherein the cost function of each of the operational coverage, capacity and handoffs includes network operator adjustable parameters and environmental-dependent parameters.

12. The component of claim 11, wherein the automatic adjustment involves network operator adjustable parameters.

13. The component of claim 9, wherein the radio access network operates using orthogonal frequency division multiple access (OFDMA).

14. The component of claim 13, wherein the radio access network is a WiMAX network.

15. The component of claim 9, wherein the radio access network is a code division multiple access (CDMA), Global System for Mobile Communication (GSM), integrated digital enhanced network (iDEN), evolution-data only (EV-DO) CDMA network or Enhanced Data GSM Environment (EDGE) network.

\* \* \* \* \*